United States Patent
Barbian et al.

(10) Patent No.: US 7,277,246 B2
(45) Date of Patent: Oct. 2, 2007

(54) METHODS AND SYSTEMS FOR PROVIDING PREDICTIVE MAINTENANCE, PREVENTATIVE MAINTENANCE, AND/OR FAILURE ISOLATION IN A TAPE STORAGE SUBSYSTEM

(75) Inventors: Douglas F. Barbian, Lakewood, CO (US); Christopher B. Tumblin, Broomfield, CO (US); Mark A. Payne, Longmont, CA (US); Joe Ewaskowitz, Longmont, CO (US); Richard Chaney, Elbert, CO (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 10/892,948

(22) Filed: Jul. 16, 2004

(65) Prior Publication Data

US 2005/0052772 A1    Mar. 10, 2005

Related U.S. Application Data

(60) Provisional application No. 60/488,285, filed on Jul. 18, 2003.

(51) Int. Cl.
*G11B 19/02* (2006.01)
(52) U.S. Cl. .............................. 360/69; 711/4
(58) Field of Classification Search ...................... None
See application file for complete search history.

(56) References Cited

U.S. PATENT DOCUMENTS

| | | | |
|---|---|---|---|
| 5,406,955 A | | 4/1995 | Bledsoe et al. |
| 5,525,902 A | * | 6/1996 | Nakajima et al. ............ 324/212 |
| 5,828,905 A | * | 10/1998 | Rao ............................. 710/63 |
| 5,852,534 A | | 12/1998 | Ozue et al. |
| 5,872,672 A | * | 2/1999 | Chliwnyj et al. ........ 360/77.12 |
| 5,892,633 A | | 4/1999 | Ayres et al. |
| 5,894,425 A | | 4/1999 | Saliba |
| 6,043,948 A | | 3/2000 | Takayama |

(Continued)

FOREIGN PATENT DOCUMENTS

EP        0 991 071 A      4/2000

(Continued)

OTHER PUBLICATIONS

Crighton, I. (1998). "Proposal for Storage and Access of Data on Media Auxiliary Memory," *Hewlett-Packard* pp. 1-10.

(Continued)

*Primary Examiner*—Andrew L. Sniezek
(74) *Attorney, Agent, or Firm*—Morrison & Foerster LLP

(57) ABSTRACT

A system and method of operating a storage system is provided. The storage system includes a tape cartridge having a magnetic tape medium and a tape drive for reading and writing data to the magnetic tape medium of the tape cartridge. Performance data associated with specific operating loci (e.g., bands, directions, tracks, segments, etc.) of the tape drive and tape medium are collected, analyzed, and stored, allowing for analysis and detection of trends over time. In one example, tape usage events are monitored and when they cross a threshold the system may remove particular tapes in a preventative maintenance approach to reduce system outage. Performance data is collected and analyzed with a portion of the performance data being saved to emulated medium auxiliary memory (EMAM) on the magnetic tape, and a portion of the of the performance data saved in non-volatile storage in the drive.

5 Claims, 9 Drawing Sheets

U.S. PATENT DOCUMENTS

| | | | |
|---|---|---|---|
| 6,075,669 | A | 6/2000 | Takayama |
| 6,084,736 | A | 7/2000 | Kurokawa et al. |
| 6,269,422 | B1 | 7/2001 | McDonald et al. |
| 6,408,405 | B1 | 6/2002 | McDonald et al. |
| 6,425,042 | B1 * | 7/2002 | Ikeda et al. .............. 711/4 |
| 6,501,612 | B1 | 12/2002 | Kato et al. |
| 6,519,105 | B1 | 2/2003 | Takayama |
| 6,535,344 | B1 | 3/2003 | Takayama |
| 6,674,596 | B1 | 1/2004 | Takayama |
| 2002/0067564 | A1 | 6/2002 | Azuma |
| 2002/0126410 | A1 * | 9/2002 | Doi et al. .............. 360/69 |
| 2004/0153689 | A1 * | 8/2004 | Assaf .................. 714/1 |

OTHER PUBLICATIONS

European Search Report mailed on Nov. 24, 2004 for EP application No. 04254327.2, 3 pages.

Jerman, S. (Jul. 13, 1999). "Proposal for Storage and Access of Data on Media Auxiliary Memory," Document T10/99-232-r0, pp. 2-18.

Jerman, S. et al. (May 4, 2000). "Proposed Addition of Read and Write Attribute Commands to SPC-2," Document T10/99-148r7 pp. 1-23.

NASI and Hewlett Packard. "HP Ultrium 230 Tape Drive Tape Products Range." located at <http://web/20030611141841/www.nasi.com/pdfs/HP-UltriumPrimer.pdf>, last visited on Oct. 21, 2004, pp. 1-11.

Weber, R., ed. (Jan. 10, 2002). "Information Technology—SCSI Primary Commands-3 (SPC-3)," Working Draft for Project T10/1416-D, Revision 03, Reference No. ISO/IEC 14776-313:200X, ANSI NCITS: ***, 200X pp. 1-330.

Nasi. "HP Ultrium 230 Tape Drive," located at <http://web.archive.org/web/20030619022110/www.nasi.com/hp_ultrium230.htm.>, last visited on Dec. 13, 2005, p. 1.

* cited by examiner

```
sample drive log implementation:
    Typedef Struct
    {
        char Drive_Serial_Number[16];
        short MostRecentMountNumber;
    } DriveEntry_T;

Typedef Struct
    {
        uchar CurrentDriveIndex;
        DriveEntry_T DriveLogEntries[50];
    } DriveLog_T;
    DriveLog_T DriveLog;
```

*FIG. 5A*

```
sample media map implementation:
    Typedef Struct            // WRITE Structure
    {
        uchar DriveLogIndexNum;
        ushort Rewrites;
        ushort LoadCount;
        uchar TservoW;
        uchar TServoC : 6;
        uchar HWE     : 1;
        uchar reserved : 1;
    } TrkSegWrtEntry_T;
    TrkSegWrtEntry_T WrtMediaMap[NumTrks][NumSegs][WrtHistoryDepth];

sample access of 1st TrkSegWrtEntry struct element for Trk1-Seg2-hist#0:
    WrtMediaMap[1][2][0].DriveLogIndexNum = DriveLog.CurrentDriveIndex;

Typedef Struct            // READ Structure
    {
        uchar DriveLogIndexNum;
        ushort MissingBlocks;
        ushort LoadCount;
        uchar TservoW;
        uchar TServoC : 6;
        uchar HRE     : 1;
        uchar reserved : 1;
    } TrkSegReadEntry_T;
    TrkSegReadEntry_T ReadMediaMap[NumTrks][NumSegs][ReadHistoryDepth];

sample access of 2nd TrkSegReadEntry struct element for Trk2-Seg3-hist#1:
    ReadMediaMap[2][3][1].MissingBlocks = GetMissingBlksForCurSeg();
```

*FIG. 5B*

| WRITE data examples: | | |
|---|---|---|
| | Seg 1 | Seg 2 |
| TRK 0 (forward) | {mount=87 drive=01 rewrites=0141 HME=False TServoW=02 TservoC=00}<br>{mount=90 drive=02 rewrites=022E HME=False TServoW=06 TservoC=00}<br>drive=07 rewrites=013F HME=False TServoW=02 TservoC=00} {mount=97<br>drive=04 rewrites=011F HME=False TServoW=03 TservoC=01} {mount=100<br>drive=09 rewrites=0265 HME=False TServoW=05 TservoC=00} {mount=105 | {mount=87 drive=01 rewrites=0125 HME=False TServoW=01 TservoC=00}<br>{mount=90 drive=02 rewrites=032A HME=False TServoW=04 TservoC=00}<br>{mount=97 drive=07 rewrites=015B HME=False TServoW=02 TservoC=00}<br>{mount=100 drive=04 rewrites=022B HME=False TServoW=02 TservoC=00} |
| TRK 1 (backward) | {mount=87 drive=01 rewrites=05AA HME=False TServoW=19 TservoC=00}<br>{mount=90 drive=02 rewrites=0155 HME=False TServoW=01 TservoC=00} | {mount=87 drive=01 rewrites=0A5E HME=False TServoW=89 TservoC=00}<br>{mount=90 drive=02 rewrites=0170 HME=False TServoW=01 TservoC=00}<br>{mount=97 drive=07 rewrites=0053 HME=False TServoW=07 TservoC=02} |

*FIG. 6*

| Information for error validation | | |
|---|---|---|
| | EMAM(tape) | EEROM(drive) |
| Drive related Channel(s) problems | rewrts[trk][seg] | rewrts[chan][dir] |
| Drive related Servo Tracking problems | TServoWarn[trk][seg]<br>TServoCrit[trk][seg] | TServoWarn[trk]<br>TServoWarn[seg]<br>TServoCrit[trk]<br>TServoCrit[seg] |
| magnetic tape defect | rewrts[trk][seg] | rewrts[dir] |
| Tracking Servo tape defect | TServoWarn[trk][seg]<br>TServoCrit[trk][seg] | TServoWarn[trk]<br>TServoWarn[seg]<br>TServoCrit[trk]<br>TServoCrit[seg] |
| supersets of data: | rewrts[trk][seg]<br>TServoWarn[trk][seg]<br>TServoCrit[trk][seg] | rewrts[chan][dir]<br>TServoWarn[trk]<br>TServoWarn[seg]<br>TServoCrit[trk]<br>TServoCrit[seg] |

*FIG. 7A*

| Information for error validation | | |
|---|---|---|
| | EMAM(tape) | EEROM(drive) |
| Drive related Channel(s) problems | MissingEnvBlks[trk][seg] | MissingEnvBlks[dir] |
| Drive related Servo Tracking problems | TServoWarn[trk][seg]<br>TServoCrit[trk][seg] | TServoWarn[trk]<br>TServoWarn[seg]<br>TServoCrit[trk]<br>TServoCrit[seg] |
| magnetic tape defect | MissingEnvBlks[trk][seg] | MissingEnvBlks[dir] |
| Tracking Servo tape defect | TServoWarn[trk][seg]<br>TServoCrit[trk][seg] | TServoWarn[trk]<br>TServoWarn[seg]<br>TServoCrit[trk]<br>TServoCrit[seg] |
| supersets of data: | MissingEnvBlks[trk][seg]TServoWarn[trk][seg]<br>TServoCrit[trk][seg] | MissingEnvBlks[dir]<br>TServoWarn[trk]<br>TServoWarn[seg]<br>TServoCrit[trk]<br>TServoCrit[seg] |

*FIG. 7B*

METHODS AND SYSTEMS FOR PROVIDING PREDICTIVE MAINTENANCE, PREVENTATIVE MAINTENANCE, AND/OR FAILURE ISOLATION IN A TAPE STORAGE SUBSYSTEM

CROSS-REFERENCE TO RELATED APPLICATION

The present application claims benefit of earlier filed provisional patent application, U.S. Application No. 60/488,285, filed on Jul. 18, 2003, and entitled "METHODS AND SYSTEMS FOR MANAGING TAPE STORAGE ENVIRONMENTS," which is hereby incorporated by reference as if fully set forth herein.

BACKGROUND OF THE INVENTION

Storage subsystems, such as magnetic tape libraries, are widely used for storing information in digital form. An exemplary tape storage subsystem 100 is shown in FIG. 1. These tape subsystems 100 may include a storage subsystem controller 101 for controlling one or more tape drives 102 contained within the storage subsystem 100 and for controlling other components of the storage subsystem 100, such as the tape picker, which is used to select and load tape cartridges 106 into the tape drives 102. The storage subsystem 100 may be coupled to a host system 110, which transmits I/O requests to the storage subsystem 100 via a host/storage connection 112.

The tape drive 102 reads and writes data to the primary storage medium, shown in FIG. 1 as a magnetic tape medium 104 contained within a removable magnetic tape cartridge 106. The magnetic tape medium 104 typically comprises a thin film of magnetic material, which stores the data. The tape medium 104 may be moved by the tape drive 102 between a pair of spaced apart reels and past a data transducer to record or read back information. In one type of tape drive system, one of the reels is part of the tape drive 102 while the other reel is part of the removable tape cartridge 106. For this type of tape drive system, the reel which is a part of the tape drive 102 is commonly referred to as a take-up reel, while the reel which is a part of the tape cartridge 106 is commonly referred to as a cartridge reel. Upon insertion of the tape cartridge 106 into the tape drive 102, the magnetic tape medium 104 on the cartridge reel is coupled to the take-up reel of the tape drive 102. Subsequently, prior to removing the tape cartridge 106 from the tape drive 102, the storage tape 104 is rewound onto the cartridge reel and is then uncoupled from the take-up reel.

In some tape storage subsystems, the removable tape cartridge 106 is provided with a non-volatile auxiliary memory 108 for storing data in a separate storage medium from the primary storage medium. This data is separate from and in addition to the data stored on the primary storage medium. This auxiliary memory 108 can be, for example, a solid state non-volatile memory such as an electrically erasable programmable read-only memory (EEPROM) or a flash memory which is contained in the housing for the tape cartridge 106. One standard being proposed for incorporating and using such an auxiliary memory in a tape cartridge is referred to as "Medium Auxiliary Memory" (or MAM). This proposed standard is described in "Working Draft SCSI Primary Commands-3 (SPC1-3)", Project T10/1416-D, Revision 13, dated May 16, 2003, incorporated by reference herein in its entirety. In addition, the information described in U.S. provisional patent application Ser. No. 60/475,679, and entitled, EMULATION OF AUXILIARY MEMO MAGNETIC TAPE MEDIA, is incorporated herein by reference in its entirety as if fully set forth herein.

Further, in storage systems having tape cartridges (with or without auxiliary memory) various read/write errors may occur that originate with the tape cartridge, the tape drive, or a combination of both. When errors occur it may not be evident if the errors are a result of the tape drive or the tape cartridge making corrective or predictive action difficult.

Therefore, in various storage environments including tape cartridges and tape drives it is desired to be able to diagnose errors and manage tape cartridges and tape drives to determine the cause or likely cause of errors and manage and/or predict future errors in the system. Such a management system may allow one to take preventive measures and manage the system with reduced error rates and increased efficiency. Thus, the ability to determine where errors are likely to occur, monitor utilization of particular tape drives or tape cartridges in a storage system, and take corrective measures to ensure the reliability and security of the tape storage environment are desired.

BRIEF SUMMARY OF THE INVENTION

In accordance with one aspect of the present invention, a storage system is provided. An exemplary storage system includes a tape cartridge having a magnetic tape medium and a tape drive for reading and writing data to the magnetic tape medium of the tape cartridge. Performance information such as history data and/or error data associated with operating loci (e.g., bands, directions, tracks, segment, or the like) of the tape drive and magnetic medium are stored at least partially on the magnetic tape medium and on a memory of the tape drive. The tape drive memory may further include one or more algorithms for collecting and assessing the performance data to process history or error information from the drive or magnetic tape to perform diagnostic or predictive analysis.

In one example, the tape drive may include an EEROM memory or the like to store performance data and may further include one or more algorithms to assess the performance data. The storage system may further include an auxiliary memory emulator for receiving I/O commands to perform I/O operations on an auxiliary memory and for rerouting said commands to perform said I/O operations on the magnetic tape medium of the tape cartridge. Further, the history or error data may be stored and updated in data buckets corresponding to particular bands, tracks, segments, etc. of the magnetic tape, such that only those buckets corresponding to tracks and segments that were actually read or written to are updated with new data.

In accordance with an additional aspect of the present invention, diagnostic, e.g., error and history information of the tape cartridge and media drive, may be accessed through multiple ports. In one example, the diagnostic information may be accessed through a SCSI interface and a secondary infrared port associated with the media drive. Portable devices, such as a laptop or hand held device, may be used to interact with the media drive memory via the infrared port and access, for example, history and error data associated with tape drive.

Other features and aspects of the invention will become apparent from the following detailed description, taken in conjunction with the accompanying drawings which illustrate, by way of example, the features in accordance with embodiments of the invention. The summary is not intended

BRIEF DESCRIPTION OF THE DRAWINGS

FIGS. 5A and 5B illustrate an exemplary drive log and WRITE/READ log structures respectively.

FIG. 6 illustrates a table of a WRITE data example.

FIGS. 7A and 7B illustrate exemplary tables of information for error validation for WRITE and READ operations.

Figure 1:
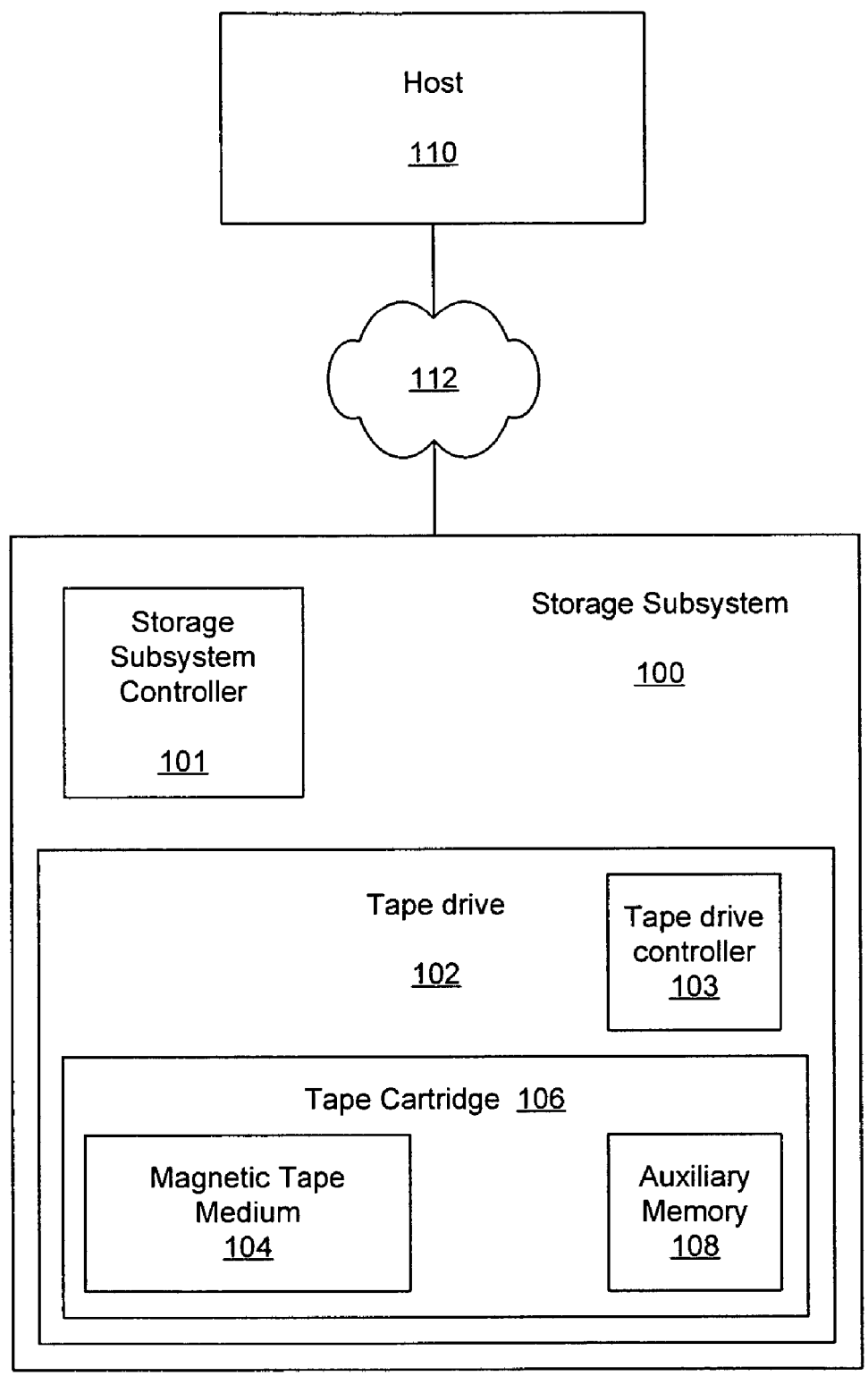
FIG. 1 illustrates a tape storage subsystem.

In the following description, reference is made to the accompanying drawings which form a part thereof, and which illustrate several embodiments of the present invention. It is understood that other embodiments may be utilized and structural and operational changes may be made without departing from the scope of the present invention. The use of the same reference symbols in different drawings indicates similar or identical items.

DETAILED DESCRIPTION OF THE INVENTION

The following description is presented to enable any person skilled in the art to make and use the invention. Descriptions of specific structures, functions, techniques, and applications are provided only as examples. Various modifications to the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the scope consistent with the appended claims.

Some portions of the detailed description which follows are presented in terms of procedures, steps, logic blocks, processing, and other symbolic representations of operations on data bits that can be performed on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical or magnetic signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

According to one aspect of the present invention, operational capabilities of the tape drive system can be ascertained and/or predicted by analyzing various performance data or parameters indicative of various performance related characteristics of the tape drive and/or tape media. Such performance indicators are referred to herein as operation performance data or performance parameters.

In one example, performance data is collected for the drive and the current medium in the drive. In particular, performance data is collected into "buckets" corresponding to different loci of the tape drive and tape medium. The buckets are generally of different sizes and dimensions because different performance parameters typically have different storage sizes, and different performance parameters are saved for the drive and the medium in the drive. The "bucket centric" approach to storing performance data reduces the need to store each and every performance parameter in the drive and on the medium every sampling time. For example, each performance parameter bucket is only updated when new data is deemed more relevant than previously stored data within that particular bucket, otherwise the previously stored, more relevant data will be maintained (i.e., it will not be written over). In this manner, the storage capacity for performance data is reduced compared to systems storing all data, and storage capacity that is utilized has more relevant data than a massive memory space containing every performance parameter for the drive and media.

Different bucket types and sizes may be created to accumulate the performance operating parameters for storage in the drive (e.g., EEROM) and on the medium (e.g., EMAM). Appropriate buckets types will be stored on the drive to validate data analysis of the tape buckets and appropriate buckets will be stored on the tape to validate data analysis of the drive buckets. Multiple copies of the drive and media buckets may be collected and then recorded over time to provide a history of operational performance of the system.

By collecting, monitoring, and analyzing these performance parameters over time, the operational health of the tape drive and media can be determined. Additionally, the performance parameters can be used to predict the future operational health such that poor operating performance of the drive and/or media can be averted. In situations where the storage subsystem operation has degraded, isolation algorithms may use the performance parameters to determine whether the tape drive or media may be causing non-optimal operation.

In accordance with an additional aspect of the present invention, diagnostic information (tape usage and wear indicators, performance operating parameters, histories of media and drive performance, and results of failure isolation, etc.) of the tape drive and media cartridge may be accessed through multiple ports. In one example, the diagnostic information may be accessed through a SCSI interface and a secondary infrared port associated with the drive. Portable devices, such as a laptop or hand held device, may be used to interface with the drive memories containing performance parameters to assist in failure isolation.

Given the diagnostic information described above, external applications and algorithms can be created to analyze data presented by the subsystem. For example, a host application can be created to do more extensive analysis and failure isolation. Furthermore, algorithms can be created to view the entire storage system landscape and make additional failure isolation determinations.

Figure 2:
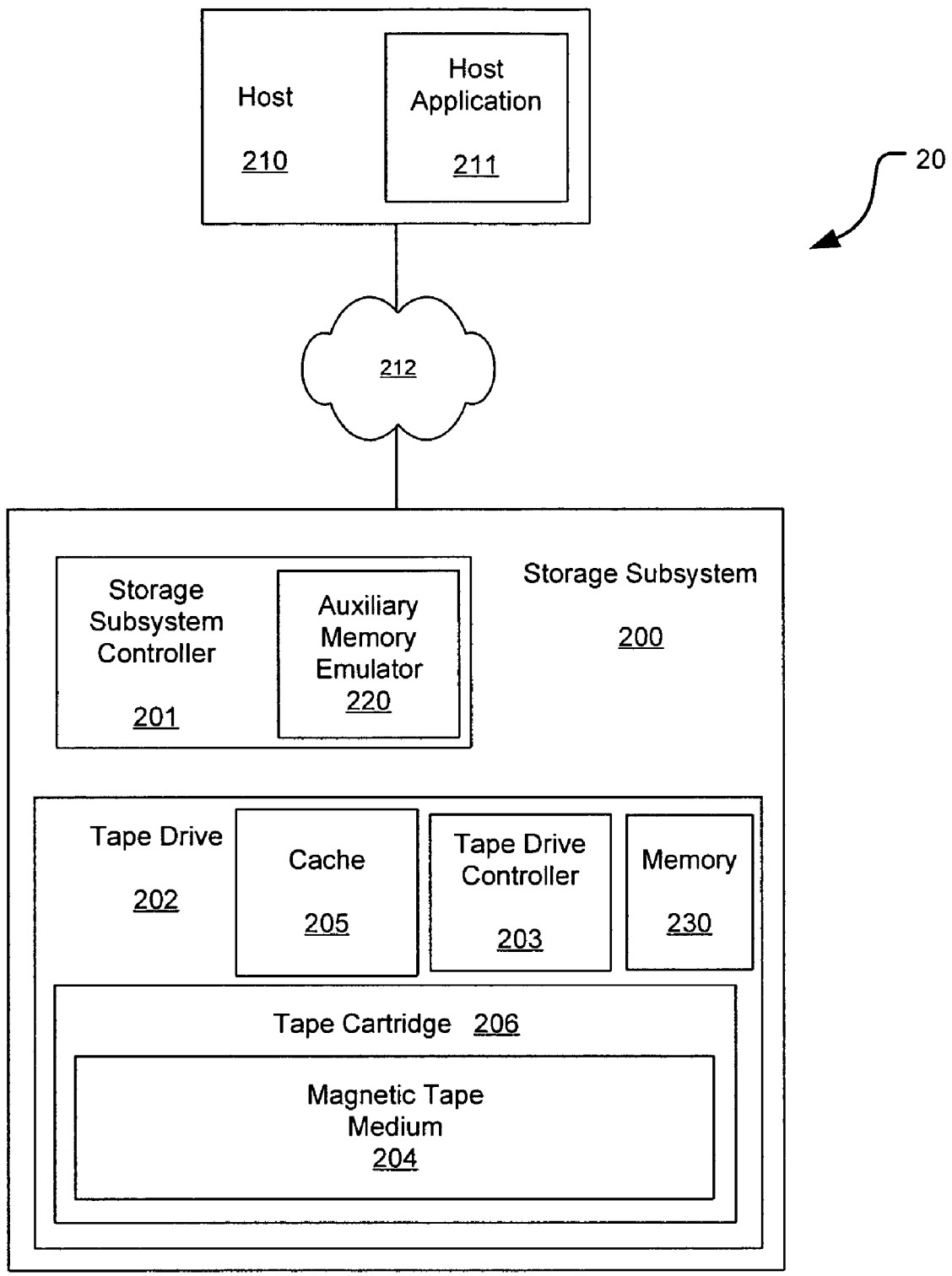
FIG. 2 illustrates a simplified block diagram of a storage subsystem in accordance with embodiments of the present invention.

FIG. 2 shows a simplified block diagram of an exemplary system 20 including a storage subsystem 200 in accordance with aspects of the present invention. In the illustrated embodiment, the storage subsystem 200 includes a storage subsystem controller 201 and one or more tape drives 202 (for clarity, only one tape drive is shown). Each tape drive 202 may include a tape drive controller 203, a tape drive memory 230 and a removable tape cartridge 206. In this case, the removable tape cartridge 206 includes a magnetic tape medium 204 as the primary storage medium for storing data and does not include an auxiliary memory. A similar storage system is described in U.S. provisional patent application Ser. No. 60/475,679, and entitled, EMULATION OF AUXILIARY MEMORY ON MAGNETIC TAPE MEDIA, which is hereby incorporated herein by reference in its entirety.

It should be understood, however, that various management and diagnostic methods described herein are applicable to systems with or without a MAM. Additionally, other memories for storing history and error information excluding MAM or eMAM are contemplated and possible. For example, error data and history information may be included and stored in a directory segment of a magnetic tape and retrieved for management purposes as described herein.

A host system 210 is coupled to the storage subsystem 200 via a host/storage connection 212. The host system 102 may comprise any computational device known in the art including, for example, a server class machine, a mainframe, a desktop computer, a laptop computer, a hand held computer, or a telephony device. The host/storage connection 212 can be, for example, a local bus, a network connection, an interconnect fabric, wireless, or other suitable communication channel. In some embodiments, a plurality of host systems 210 can be in communication with the storage subsystem 200 via the host/storage connection 212, or a plurality of storage subsystems 200 can be in communication with one or more host systems 210.

The host system 210 may include a host application 211, which transmits I/O requests to read and/or write data to the magnetic tape medium 204. This host application 211 may also be configured to read and/or write data to an auxiliary memory provided in the tape cartridge. However, as described above, the tape cartridge 206 loaded into the tape drive 202 is not provided with an auxiliary memory. In a conventional system, such an I/O request from the host application 211 to a non-existent auxiliary memory may result in an error, a failure, or other non-optimal functioning of the storage subsystem 200.

In this example, an auxiliary memory emulator is provided for receiving I/O requests to read and/or write data to an expected but non-existent auxiliary memory. In FIG. 2, an auxiliary memory emulator 220 is provided as part of the storage subsystem controller 201. The auxiliary memory emulator 220 may comprise code provided in hardware, firmware, or memory for rerouting the I/O requests to the auxiliary memory. When the tape cartridge 206 is loaded into the tape drive 202, the auxiliary memory emulator 220 reads all attribute data from an emulated auxiliary memory region 406 (see FIG. 4) of magnetic tape medium 204 into tape drive memory 230. Tape drive 202 can then respond to any I/O requests to read attribute data without the need to read the emulated auxiliary memory region 406 again. Requests to write attribute data are immediately flushed to the primary storage medium if the medium is still located at the beginning of tape (BOT) 410, otherwise this data is written to tape drive memory 230 and flushed to the auxiliary memory region 406 when the tape is again positioned at BOT 410. The auxiliary memory emulator further reroutes those I/O requests to read and/or write the data to the primary storage medium, e.g., the magnetic tape medium 204.

Figure 3:
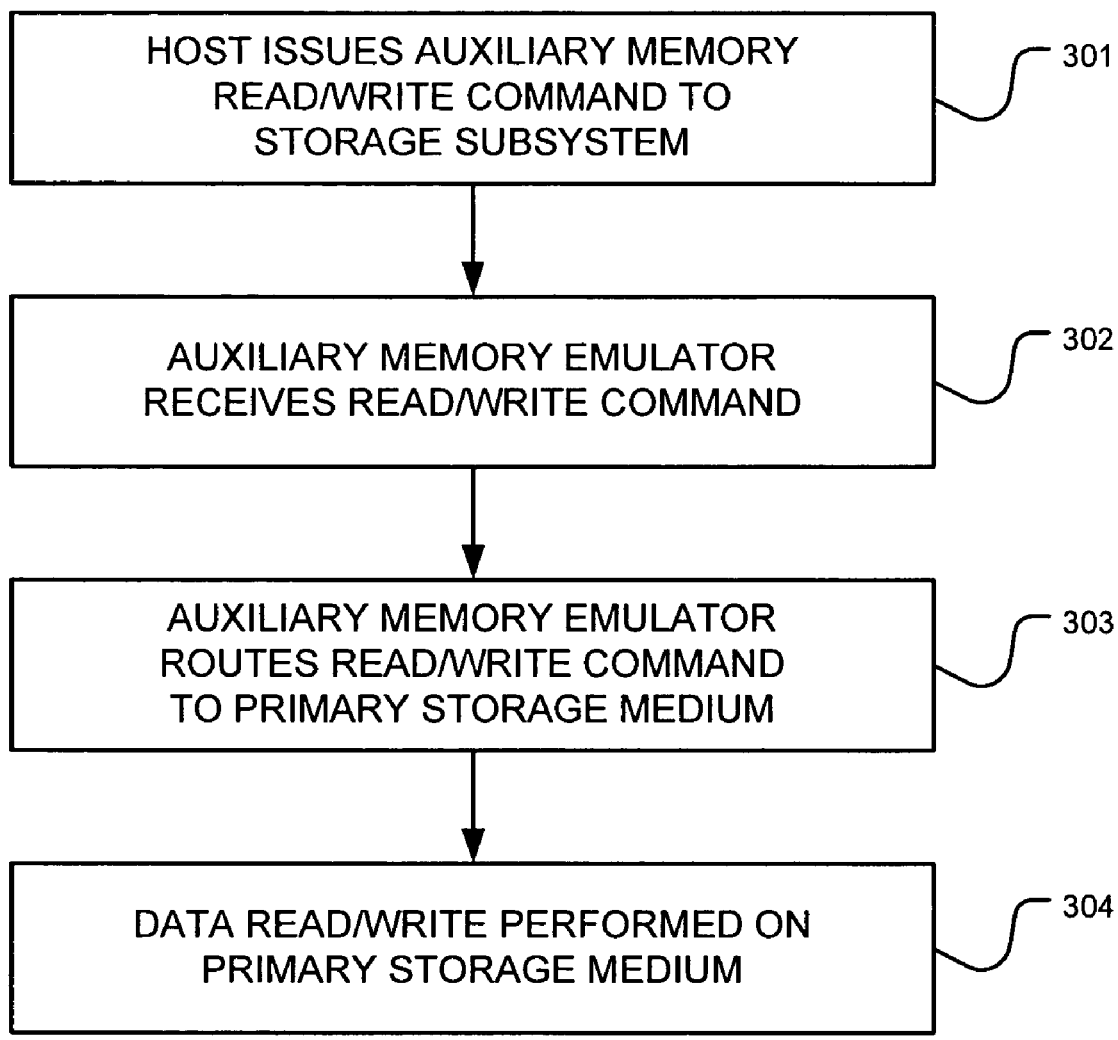
FIG. 3 illustrates a flowchart showing a method of emulating an auxiliary memory in accordance with embodiments of the present invention.

FIG. 3 is a flowchart showing a method of emulating an auxiliary memory using the system illustrated in FIG. 2 in accordance with embodiments of the present invention. In step 301, the host system 210 issues an I/O request using a command to read and/or write to the auxiliary memory, which the host application 211 is programmed to expect to be contained in the tape cartridge 206. This I/O request can be, for example, a READ ATTRIBUTE or WRITE ATTRIBUTE command to a Medium Auxiliary Memory (MAM) in compliance with the SCSI Primary Commands-3 specification. The READ ATTRIBUTE command can be used to retrieve attribute data. The WRITE ATTRIBUTE command can be used to store attribute data. These commands are intended to be vendor-independent and can be adopted by any host application.

In step 302, this read/write command is received by the auxiliary memory emulator 220 in the storage subsystem controller 201. In some embodiments, the storage subsystem controller 201 may include a host interface for receiving all I/O requests (such as the standard SCSI commands described above) and the auxiliary memory emulator 220 may be a component of the software or firmware incorporated into the storage subsystem controller 201 for handling the I/O requests. For example, when a SCSI WRITE ATTRIBUTE command to write data to the MAM is issued by the host application 221, the storage subsystem controller 201 recognizes that the tape cartridge 206 does not include a MAM chip to which the data can be written. The SCSI WRITE ATTRIBUTE command is handled by the auxiliary memory emulator 220. In some embodiments, the tape drive 202 is configured to read and/or write data only to the magnetic tape medium 204 and does not include an interface for reading and/or writing data to an auxiliary memory. In this situation, the firmware in the storage subsystem controller 201 is adapted to automatically route all I/O requests for the auxiliary memory to the auxiliary memory emulator 220. In other embodiments, the tape drive 202 may be configured to first determine whether the tape cartridge currently loaded in the tape drive 202 includes an auxiliary memory. If an auxiliary memory is located, then the I/O requests to the auxiliary memory are passed onto the auxiliary memory. If an auxiliary memory is not located, then the I/O requests are handled by the auxiliary memory emulator 220.

In step 303, the auxiliary memory emulator 220 routes the command to read and/or write device, medium, host, or vendor unique attributes to read and/or write attribute command processors. The read attribute command processors collect the MAM attribute data from tape drive memory 230 and transfer it to the host. The write attribute command processor copies the write attribute data to tape drive memory 230, then determines if the location is at BOT 410 (see FIG. 4) and if so immediately flushes the write attribute data to the primary storage medium 204, otherwise the data is written to tape drive memory 230 and flushed to the auxiliary memory region 406 when the tape is again positioned at BOT 410. In FIG. 2, the primary storage medium is the magnetic tape medium 204 in the tape cartridge 206. In step 304, the data written is performed on the primary storage medium when the medium is located at BOT.

Figure 4:
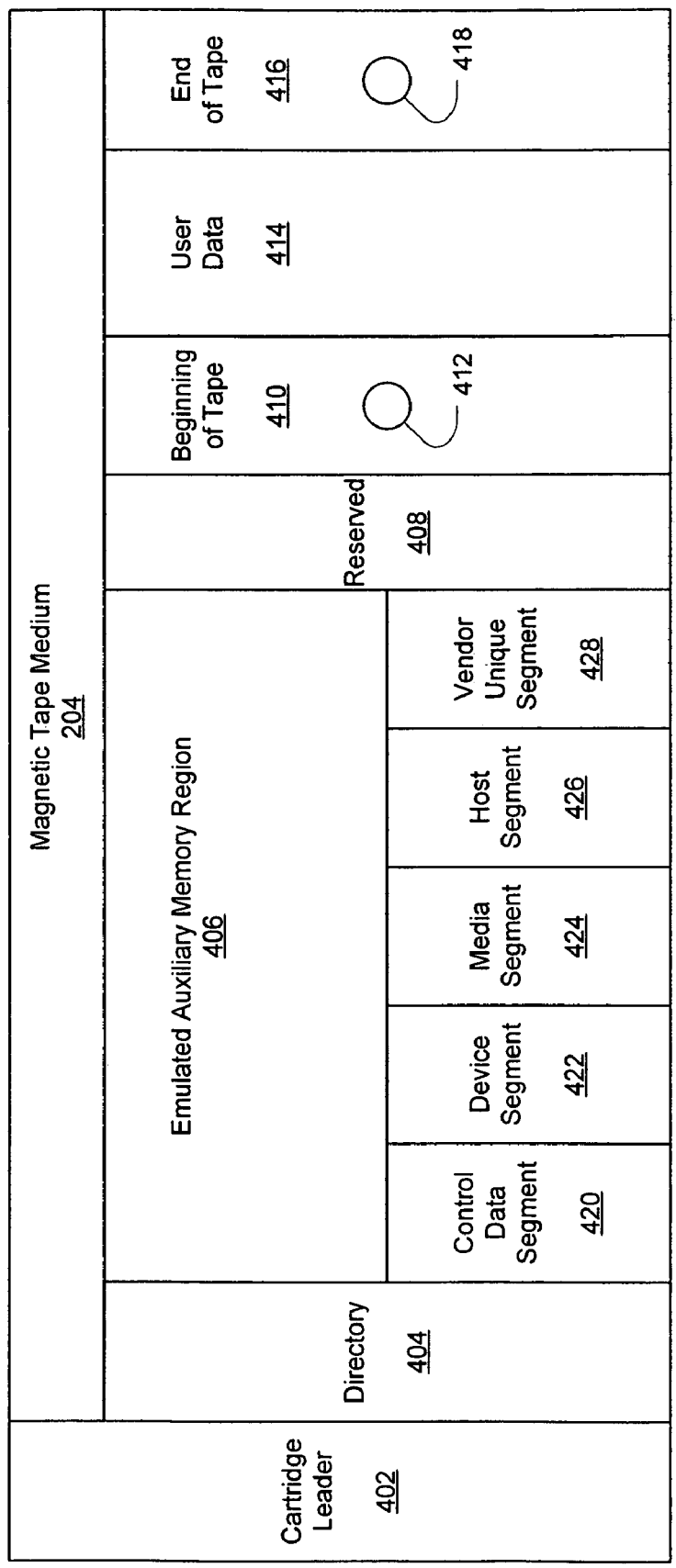
FIG. 4 illustrates a block diagram illustrating a region of the magnetic tape medium utilized for the emulated auxiliary memory in accordance with embodiments of the present invention.

FIG. 4 is a block diagram illustrating a region of the magnetic tape medium 204 utilized for the emulated auxiliary memory in accordance with embodiments of the present invention. At the beginning of the magnetic tape medium 204 is the cartridge leader 402. The cartridge leader 402 is coupled to the buckle mechanism for coupling with a drive leader of the tape drive 202 and is not used to store data. Next is a directory region 404, which stores conventional directory data used to enable the tape drive 302 to access user data in an efficient manner. A calibration region (not shown) may also be provided before the directory region 404 for assisting the tape drive 202 in its initial calibration process. The directory region 404 is followed by an emulated auxiliary memory region 406. The emulated auxiliary memory region 406 is used to store data that would have been stored in a separate auxiliary memory provided in the tape cartridge 206. The emulated auxiliary memory region 406 can be segmented into multiple regions for storing specific types of data and having different types of access restrictions. Next is a reserved region 408 which contains a predetermined amount of recordable space reserved for future use. The reserved region 408 can be used, for example, to expand the emulated auxiliary memory region 406, if additional capacity is desired.

After the reserved region 408 is a beginning of tape region 410, which is indicated by a beginning of tape hole 412. The tape drive 202 searches for the beginning of tape hole 412 to determine where to begin storing the user data in the user data region 414. It will be noted that FIG. 4 is not to scale; in typical tape cartridges, the user data region 414 consumes the vast majority of the length of the magnetic tape medium 204. After the user data region 414 is an end of tape region 416 marked by an end of tape hole 418.

In one embodiment, the structure of the emulated auxiliary memory region 406 corresponds to the data structure defined by the SCSI standard for MAM. In accordance with the SCSI-standard READ ATTRIBUTE and WRITE ATTRIBUTE commands, data may be written to and/or read from a device segment 422, a media segment 424, and a host segment 426 provided in the emulated auxiliary memory region 406. The SCSI standard provides detailed requirements for the various data segments. In other embodiments, the emulated auxiliary memory region 406 may not adhere to the SCSI standard and the various segment types and access rules for those segments may vary.

In the example of FIG. 4, device segment 422 may be used to store performance information including error data relating to the cartridge, drive history information, and other predictive failure information. For example, device segment 422 can be used to store device attributes such as data regarding the operation of the tape drive 202, such as, for example, the load count for that particular tape cartridge 206. Further, information relating to drive related channel problems, drive related servo tracking problems, magnetic tape defect errors, tracking servo tape errors, and the like. The error data may be stored for tracks and segments that have read/write activity. The error data may be retrieved and processed for diagnostic and predictive analysis to more efficiently manage the system as described in greater detail below.

It should be recognized, however, that error data may be stored in other segments, and in other locations, and may be further distributed over more than one data segment of tape medium 204. For example, history and error information may be stored and retrieved from directory 404 and used for diagnostic and predictive analysis.

Additional segments may also be included in the embodiment shown in FIG. 4. The media segment 424 can be used to store attributes of the magnetic tape medium 204. These attributes can include, for example, the tape manufacturer's identity, the production date, or other information relating to the identity of the tape medium 204. It may be desired to restrict write access to the media segment 424 to only the original tape manufacturer. The tape drive controller 203, the storage subsystem controller 201, and the host system 210 may be limited to read-only access to this media segment 424. Finally, the host segment 426 can be used to store host attributes. These host attributes may include any data which the host application 211 may wish to store. This can include, for example, a tape label, a date stamp, and information identifying the host application 211 writing the data to the tape cartridge. It may be desired to provide unlimited read and write access to the host area 412. A control data segment 420 may also be provided for managing the updates to the emulated auxiliary memory region 406 over the life of the tape cartridge 206, and a vendor unique segment 428 may be provided for storing vendor data.

It is to be understood that the above-described structure, location, and access rules for the emulated auxiliary memory region 406 are exemplary. In other embodiments, the emulated auxiliary memory region may be provided in a different location on the magnetic tape medium 204 or may be stored in multiple locations on the magnetic tape medium 204. The type, arrangement, and content of data being stored (e.g., device attributes, medium attributes, and host attributes) and the read/write restrictions on that data may vary. The use of standard SCSI-compliant commands to read and/or write data to the emulated auxiliary memory region 406 can provide improved compatibility between various tape drives, storage subsystems, and host applications. However, in other embodiments, alternative I/O commands may be used to access the emulated auxiliary memory region 406.

In some embodiments, all of the data stored in the emulated auxiliary memory area 406 may be read into a cache memory 205 provided in the tape drive 202 or the tape drive controller 203 during initial loading of the tape cartridge 206 in the tape drive 202. Then, as the host system 210 issues read commands to auxiliary memory, the auxiliary memory emulator 220 may retrieve the requested data from the cache memory 205 instead of reading the data directly from the magnetic tape medium. Similarly, any write commands to auxiliary memory are routed by the auxiliary memory emulator 220 to the cache memory 205. Before the tape cartridge 206 is unloaded from the tape drive 202, the contents of the cache memory 205 are recorded to the emulated auxiliary memory area 406 of the magnetic tape medium 204. Then, the next time the tape cartridge 206 is loaded into the tape drive 202 or another tape drive, the contents of the emulated auxiliary memory area 406 can be read into cache and the data accessed by host system 210 or another host. Therefore, the data stored in the emulated auxiliary memory area 406 is stored with the tape cartridge 206 to which the data relates. This may provide more efficient storage of the attribute data than if the attribute data were stored elsewhere, such as on host 210, because the attribute data is more directly associated with its corresponding tape cartridge 206. In other systems where the attribute data is stored only in the cache memory 205 and not transferred to the magnetic tape medium 204, the attribute data may be lost once the cache memory 205 is cleared for use with another tape cartridge.

Exemplary methods for storing and processing performance information such as historical and/or error data from the magnetic tape medium 204 and/or drive memory 230, for improved management of the storage system will now be described in greater detail. As discussed above, the emulated auxiliary memory region 406 can also be used to store data useful for diagnostics or predictive maintenance. In particular, statistical data regarding the operation of the tape cartridge 206 and tape drive 202 can be stored and analyzed by the storage subsystem 200, the host system 210, or tape drive 202 to predict, e.g., when the likelihood of imminent failure increases in order to initiate a failover or backup operation. Additionally, memory tape drive memory 230, which may include EEROM or the like, may store and process data useful for diagnostics or predictive maintenance of the tape drive. Additionally, algorithms in the firmware, software, hardware, or combinations thereof may examine and process the stored information associated with tape cartridge 206 and drive 202. For example, the storage system or drive 202 itself may use this information to determine whether drive 202 or tape cartridge 206 is a more likely source or potential future source of particular errors.

Any parameter that can be monitored and be used to ascertain and/or predict the operational ability of any portion of a tape storage subsystem is considered a performance parameter which may be stored to a memory of the drive and/or the storage medium. A system can be created to monitor performance operating parameters of the drive including but not limited to: Read/Write Channel performance; servo tracking performance; temperature; interface hardware; tape quality; and the like. Given the tape storage system consisting of a tape drive and tape medium, one can collect, for example, performance operating parameters for the following: error rates for each read/write channel for each block of data written to the tape; indication of off-track events (problems while servo tracking the media); current temperature; indications of transmission errors over the interface; error rates; off-track events for each; and the like.

Performance operating parameters can be monitored using one or more of the following exemplary methods. Read/Write Channel operating parameters may be monitored by collecting each individual channel's error rate. Servo tracking operating parameters can be monitored by collecting counts of off-track occurrences within vertical regions (segments) and horizontal regions (bands) of the tape. Temperature may be monitored by collecting samples from one or more thermocouples. Interface hardware may be monitored by collecting counts of error detecting notifications such as framing and parity errors. Tape quality may be monitored by storing read error, write error and tracking error counts or rates for each region of tape, and collecting tape usage counts such as number of loads, number of directory revisions, and number of medium usage hours.

FIGS. 5A and 5B illustrate an exemplary media map structure to hold error histories for each track/segment combination. The WRITE and READ logs may include various performance related history and error information such as rewrites, load count, servo tracking warnings/errors, missing blocks, and the like. These structures will store the performance data for each track/segment combination. Those skilled in the art will recognize that various other methods may be used to create suitable drive logs and media maps that may include similar or different data sets and structures, and the exemplary methods described may be carried out in a large quantity of volatile RAM based performance parameter data will be converted to much smaller subsets of data that will facilitate analysis and storage of the data. The subsets of data will be stored in what will be referred to as buckets. These buckets may accumulate the performance operating parameters for channel by direction, servo tracking by band and segment, tape read and write operation by track and segment, and tape load counts, usage hours, and directory revision updates. The tape drive memory may include various algorithms to process a history of data buckets collected over time to perform predictive and preventative maintenance of the drive.

One exemplary method of storing error or history data includes storing the data for each track and segment according to, what is referred to herein as, a data "bucket centric" method. In the case of tape history, the data bucket centric method stores history or error data for the individual segments of each individual track of the magnetic tape device that had write/read activity. The storage media history buckets may include or store multiple sets of information from different mounts and drives over time. Each set of information may include the current load count, error information, and an index into a drive log that can be used to find a unique drive serial number.

Data-bucket-centric approaches are an alternative to what is referred to herein as a "mount centric" approach specified in the MAM standard that includes storing data for all the tracks and segments on the tape for each of the last x mounts, where x may be determined based on the particular application whether or not all tracks/segments had write/read activity. The mount centric approach has several drawbacks that are overcome by using the exemplary data storage strategies described. For example, mounts that do not write/read every track and segment on the tape overwrite all data for every track/segment combination including those that were not written/read, e.g., writing all zero data to those tracks/segments. Such a method may overwrite meaningful data that may possibly indicate sources of errors and relevant history information. The new data, that may include only zero data, written into an interesting bucket, i.e., that had useful information for diagnostic or predictive purposes, may result in a loss of performance information regarding errors and error sources. In mount centric approaches, hard errors are generally stored in a separate log and are therefore more difficult to correlate with error data for analysis. Finally, complicated data replacement algorithms are generally needed to try and save the most relevant data, and under partial tape use, it is generally not possible to keep all useful error data.

The present method, however, stores or updates only those track/segment buckets that have had write/read activity, and any history/error data in other buckets is not written over, which may delete older, previously stored mount information. In this manner, any track/segment information that is written/read should retain information about performance even if many mounts have occurred since the particular track/segment has been used. Data in each bucket will only wrap or be overwritten when all the history entries for that bucket are full and space is made for a new entry. Even in this instance, however, there are still multiple pieces of history to look at for that particular bucket to perform management functions. In the mount centric methods, interesting entries, e.g., indicating particular errors and the like, may be lost simply because too many mounts have occurred following the interesting mount.

An exemplary WRITE data table result is illustrated in FIG. 6 under an exemplary method including a data-bucket-centric approach. The exemplary method is compared to a mount centric approach by also illustrating data that is overwritten and stored under the two approaches. The exemplary log includes the mount, the drive number, the number of rewrites, and various error information for the particular track and segment of the magnetic media such as servo errors and the like that may be subsequently used for diagnosis and predictive analysis by the storage system, tape drive, and the like. The bold text in FIG. 6 indicates a mount log under a mount centric approach after 5 write mounts, where only the last three mounts are retained. The smaller italicized entries indicate entries that would be pushed out or overwritten under the present data-bucket-centric method with the remaining entries still present. Note that under the mount centric method of simply saving information related to the last x mounts, in this instance 3, no data will be retained for trk1-seg1, and only one mount would be retained for trk1-seg2. In contrast, using the exemplary data-bucket-centric methods described above, the information that was saved in the track/segment buckets is retained until there is more data to replace it. Therefore, the present method provides more information for diagnostic and predictive management of a storage system.

As the performance operation parameters (for example, that are stored in volatile memory (e.g., RAM)), are analyzed it is determined which parameter data is deemed interesting, e.g., non-zero, and to be stored in buckets that may be stored in non-volatile regions of the drive (for example EEROM), and tape (for example in EMAM). A history of these performance operating parameters may be collected and recorded over time building up a history of performance of the channels in each direction; servo tracking in each band, segment, and track; temperature; interface hardware for each port or node; and tape quality in each track and segment.

In one example, the exemplary methods are performed such that performance information relating primarily to the tape and storage device is stored with the tape, and performance information relating primarily to the drive is stored on the drive memory. Further, when saving drive history information, e.g., on the drive memory, some data is not stored in the same buckets as other data, such that generalized buckets do not needlessly use valuable memory on the drive memory, e.g., an EEROM or the like. For example, channel data is desirably stored by channel and direction but need not necessarily be stored by track and segment, and tracking servo information is desirably stored by track (or band) and segment, but need not necessarily be stored by channel. If the information was stored by track, channel, and segment, the available space in the EEROM of the tape drive to store even one set of data might be insufficient. Thus, it is generally desirable to store data in a bucket only when there is interesting data to store in the bucket, e.g., non-zero data. Separate buckets may be used for tracking servo by segment, tracking servo by track, channel data forward, and channel data reverse, for example.

Generally, the tape history provides relatively good history information of magnetic tape defects and tracking servo tape defects and relatively poor history information of drive related channel problems and drive related servo tracking problems. In contrast, the drive history generally provides relatively good history information of drive related channel problems and drive related servo tracking problems and relatively poor history information of magnetic tape defects and tracking servo tape defects.

According to a further aspect of the present invention, algorithms are included in firmware or the like that will process information stored on the magnetic tape medium and information stored in the tape drive associated with the magnetic tape medium and tape drive performance. The information may include, e.g., error and history information of the tape drive and tape. The drive may then determine if the drive is experiencing errors, if the cartridge within the drive is experiencing errors, or both. Firmware may then communicate the determination or error data via T-10 standard tape alerts or SCSI commands to a management system including software for managing the storage system. Further, an exemplary tape drive may include a secondary wireless access port, e.g., an infrared access port, for use by a laptop or handheld device in addition to standard SCSI access by a host. In one aspect of the present invention, a magnetic tape storage device including an auxiliary memory emulator (or eMAM) memory portion and a media drive are configured to store performance information including, e.g., error data and history data, such as drive related channel problems, drive related servo tracking patterns, magnetic tape defects, tracking servo tape defects, hours of use, mount numbers, and the like. In one example, a portion of the error data may be stored on an emulated auxiliary memory portion of the magnetic tape, and a portion of the error data may be stored on a memory of the tape drive, e.g., EEROM or the like. The tape drive memory may further include software, e.g., algorithms and the like, to analyze performance information to assist in determining the source of errors. The stored history and error data may be utilized by the tape drive and/or the host to increase the ability to manage, detect, and predict possible errors in the storage device and/or media drive.

With regard to drive related channel problems, the eMAM (tape) preferably stores data relating to rewrites and missing blocks by track and segment during write and read process respectively as indicated in FIGS. 7A and 7B. Track and segment are selected because one may compare the history of the track and segment to determine if the tape or drive appears to be the source of errors. The EEROM (drive memory) preferably stores rewrites by channel and direction and missing envelopes by direction. Generally, a drive uses a different channel in each direction so storing both channel and direction allows verification of consistency in the drive channel when writing.

With regard to drive related servo tracking problems, the tape preferably stores data relating to servo tracking by track and segment during write and read processes. "TservoWarn" stores less severe tracking servo errors, where reposition is generally not required, and "TservoCrit" stores more severe tracking servo errors that generally result in a reposition. The drive memory preferably stores servo information separately by track and segment as indicated in FIGS. 7A and 7B during both write and read processes. By storing information separately by track and segment, problems that affect specific vertical areas or longitudinal areas may be determined, e.g., bumps in the actuator or track turn and wobble issues.

With regard to magnetic tape defect problems, the tape preferably stores rewrites and missing envelope blocks by track and segment for write and read processes respectively. The tape memory preferably stores rewrites and missing envelope blocks by direction for write and read processes respectively. To determine good overall channel performance data relating to the total channel, which is different in each direction, should be sufficient.

With regard to tracking servo tape defects, the tape preferably stores servo errors by track and segment for both write and read processes. The tape memory preferably stores servo errors separately by track and segment for both write and read processes.

As described previously with reference to FIG. 2, a host system 210 is coupled to the storage subsystem 200 via a host/storage connection 212. The host system 102 may comprise any computational device known in the art including, for example, a server class machine, a mainframe, a desktop computer, a laptop computer, a hand held computer, or a telephony device. The host/storage connection 212 can be, for example, a local bus, a network connection, an interconnect fabric, wireless, or other suitable communication channel. In some embodiments, a plurality of host systems 210 can be in communication with the storage subsystem 200 via the host/storage connection 212, or a plurality of storage subsystems 200 can be in communication with one or more host systems 210. The host system 210 may include a host application 211, which transmits I/O requests to read and/or write data to the magnetic tape medium 204. This host application 211 may also be configured to read and/or write data to an auxiliary memory provided in the tape cartridge. However, as described above, the tape cartridge 206 loaded into the tape drive 202 is not provided with an auxiliary memory. In a conventional system, such an I/O request from the host application 211 to a non-existent auxiliary memory may result in an error, a failure, or other non-optimal functioning of the storage subsystem 200.

Figure 8:
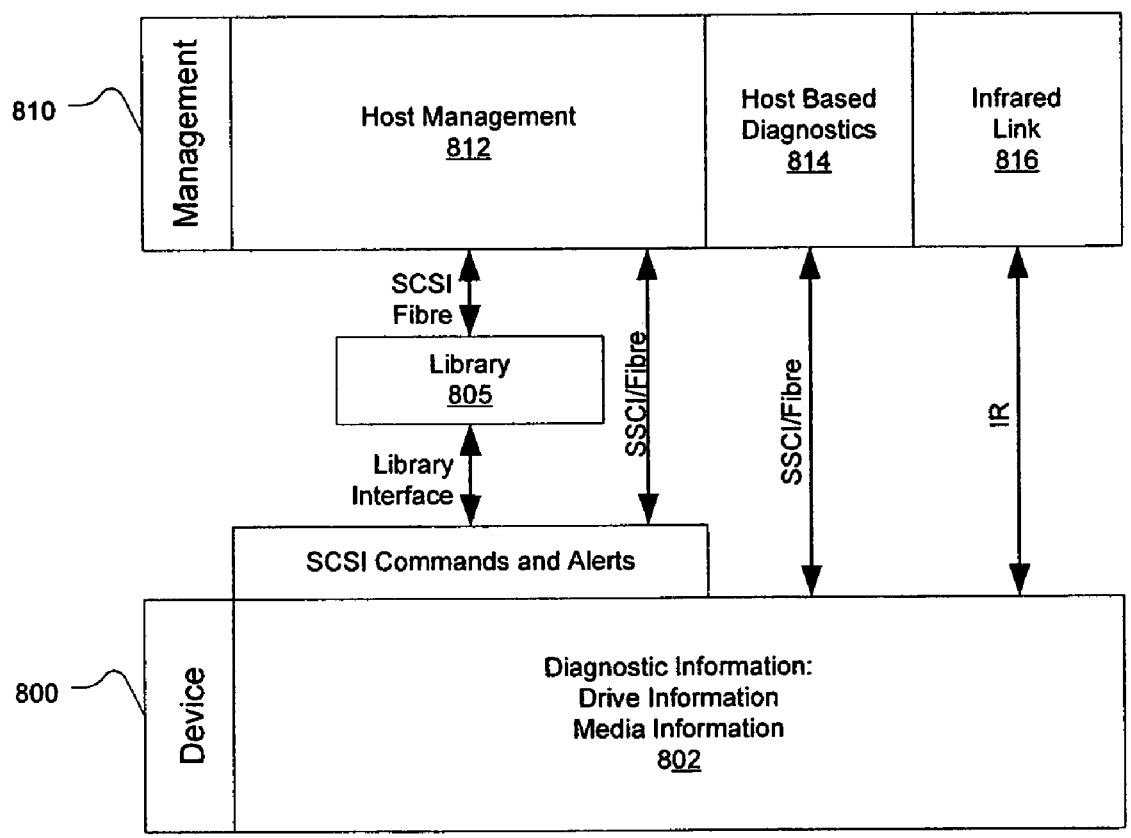
FIG. 8 illustrates an exemplary data error management environment.

FIG. 8 illustrates an exemplary system architecture for interaction and management between a storage device 800 and a management system 810. Storage device 800 may include one or more tape drives and one or more tape cartridges that include and/or produce diagnostic information 802, e.g., as described above. In this example, diagnostic information 802 may be accessible to one or more of a library interface 805, host management 812, host based diagnostics 814, and infrared link 816. Library interface 805 may further be interposed between device 800 and management system 810.

Diagnostic information 802 may include information as discussed herein such as tape and tape drive history information, e.g., log pages and media information, such as T-10 MAM or the like relating to errors and usage of a particular tape drive or tape cartridge. For example, the diagnostic information 802 may include data relating to the hours of use, temperature of tape path, error rate limits, number of retries, and the like.

Library interface 805 may receive drive and media information directly by SCSI and/or tape alerts. A library storage system may therefore receive history or error information directly from a magnetic tape cartridge. Library interface 805 in turn may communicate with host management 812 through a SCSI, Fibre channel, or the like. Drive and media information such as SCSI commands and tape alerts may also be received directly by host management 812 over a SCSI or Fibre channel.

Host management 812 communicates by any suitable manner such as SCSI, Fibre channel, and the like to a library and/or directly to diagnostic information 802 of device 800. Host management 812 may include any software, firmware, hardware, or combination therefore realized in any suitable device or structure. For example, host management system 812 may also include or be associated with host based diagnostics 814 in communication directly with diagnostic information 802 and one or more drives. Host based diagnostics 814 may provide diagnostics for all operating environments communicating using SCSI. For example, host based diagnostics 814 may include various algorithms for evaluating and predicting performance issues of the tape and tape drive. The information may be processed and organized to provide management information such as whether some drives in the storage system are being over or under used, are tape rotation protocols spreading tape usage across a library, and are backups being performed as expected. The information may allow for assessing tapes and drives that are nearing the end of their useful lives by monitoring error rates and the like, implement predictive maintenance protocols to service the storage system, and the like. Importantly, the information may also provide a user with information to determine the cause of problems, i.e., the drive or the media.

Additionally, host management 810 may include an infrared link 16 to provide communication with diagnostic information 802 through an optical infrared or other suitable wireless link. An exemplary optical infrared interface system is described in U.S. Pat. No. 5,894,425 entitled WIRELESS SECONDARY INTERFACE FOR DATA STORAGE DEVICE, which is hereby incorporated by reference. Management system 810 thereby may include secondary or any number of multiple access ports to gather diagnostic information and/or issue commands to the system, e.g., one or more drives. In one example, host based diagnostics 814 and infrared link 816 may each access diagnostic information 802. The wireless link may be made through, e.g., a laptop, handheld, or other portable device with an IR port and link directly to one or more tape drives included in the system. Infrared link 816 may further include a Windows™ based or other suitable operating system to communicate with a tape drive and obtain diagnostic information and/or issue commands via the infrared link. Infrared link 816 may also include a wireless connection to host management system 810 by any suitable manner.

Exemplary methods and algorithms are included in the system, e.g., in the tape drive memory 230 (see FIG. 2), that process performance related information such as the history data error data stored on the storage device and/or stored in the drive memory. For example, a simple algorithm will analyze basic performance information. If a cartridge stores history information of a bad performance in more than one drive, the system may conclude that the tape cartridge is the problem and not the particular drives. Also, if multiple cartridges have bad performance with a particular drive and acceptable performance with other drives in the system, it may be concluded that the particular drive is the problem. It will be apparent to those skilled in the art that more complicated and advanced algorithms may be used for diagnostic and predictive analysis.

In another exemplary method, a multi pass performance/capacity problem identification algorithm is used to increase the accuracy and to help assure that drives and media are not mistakenly and needlessly reported as bad. First, performance indicators such as re-write counts, Servo Tracking Error Counts, missing block counts, and the like are collected at each segment crossings and stored in current statistical buckets. Then each indicator is measured against pre-determined thresholds. If any of these indicators are above the threshold, then validation functions are called to look through the history of the tape and drive looking for consistency of problems in the drive/tape and a history minimum adequate performance from the tape/drive. Specifically, a validation function looks to see of there is a channel related hardware problem by looking for a history of channel problems on the same channel by evaluating the drive's channel-direction statistical buckets. If a history of problems is determined, then the track-segment buckets from the current media will be examined to assure that this section of media has at least a minimum history of adequate performance. This assures that high errors resulting from a bad piece of media will not result in a drive being reported as bad. The same approach may be used to report tape related problems (history of minimum performance from drive and history of performance problems on the media). Different tape alerts of different severities will be set against any tape or drive that is determined to have a problem or is suspected may soon encounter a problem(s).

To provide a mechanism to help users who perform very little interchange (i.e. the same tape is repeatedly loaded into the same drive), the ability to recognize this scenario and to provide error reporting without the same degree of correlation that is typically used may be provided. An example includes an instance where a single bad tape is repeatedly used in the same good drive. In this instance, a tape alert may be posted against the particular tape, even though there are no other drives in the tape's history log. When the same good tape is repeatedly loaded into the same bad drive, again a tape alert may be posted against the particular tape. The tape alert should result in a new tape being introduced to the particular drive. Through this process multiple tapes will be used to eventually set a tape alert against the drive, i.e., indicating that the drive is bad.

With this information, the drive or management system may be better equipped to make a determination of whether or not the drive in question is experiencing errors or whether the cartridge loaded in the drive is the major contributor to the errors. After making this determination, the firmware may transfer these results by either issuing a T-10 standard tape alert or by having the host management 812 access software, through e.g., host based diagnostics 814 and infrared link 816 interrogate the appropriate log pages. Thus, the exemplary system may determine the source of error between a tape drive and a tape cartridge.

The program logic described herein indicates certain events occurring in a certain order. In alternative implementations, the order of certain logic operations may be varied, modified, or removed. Moreover, steps may be added to the above described logic and still conform to the described implementations. Further, operations described herein may occur sequentially or certain operations may be processed in parallel.

The foregoing description of the preferred embodiments of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A method for managing a storage system having a tape drive and a magnetic tape storage device, comprising:
   retrieving performance data from at least one of a tape drive memory and a magnetic tape storage device, wherein the performance data includes emulated auxiliary memory storage data stored on the magnetic tape medium;
   comparing the performance data to one or more predetermined values; and
   determining a source of errors to be either a tape drive or a magnetic tape storage device if the performance data exceeds the one or more predetermined values.

2. The method of claim 1, wherein the performance data includes data stored on a memory of the tape drive.

3. The method of claim 1, further including assessing performance data through an algorithm.

4. The method of claim 1, further including assessing performance data by executing one or more preventative, predictive, or fault isolation algorithms.

5. The method of claim 1, further including assessing performance data stored in the drive through a secondary port and executing one or more preventative, predictive, or fault isolation algorithms.

* * * * *